US012581398B2

(12) United States Patent
Fu et al.

(10) Patent No.: US 12,581,398 B2
(45) Date of Patent: Mar. 17, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Fei Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 252 days.

(21) Appl. No.: 18/209,698

(22) Filed: Jun. 14, 2023

(65) Prior Publication Data

US 2023/0328636 A1    Oct. 12, 2023

Related U.S. Application Data

(63) Continuation of application No. PCT/CN2021/082895, filed on Mar. 25, 2021.

(51) Int. Cl.
| | |
|---|---|
| *H04W 48/16* | (2009.01) |
| *H04W 36/00* | (2009.01) |
| *H04W 48/18* | (2009.01) |
| *H04W 48/20* | (2009.01) |
| *H04W 72/56* | (2023.01) |

(52) U.S. Cl.
CPC ........... *H04W 48/16* (2013.01); *H04W 36/13* (2023.05); *H04W 48/18* (2013.01); *H04W 48/20* (2013.01); *H04W 72/56* (2023.01)

(58) Field of Classification Search
CPC ..... H04W 36/13; H04W 48/16; H04W 48/18; H04W 48/20; H04W 72/56
See application file for complete search history.

(56) References Cited

U.S. PATENT DOCUMENTS

| | | | |
|---|---|---|---|
| 10,785,692 B2* | 9/2020 | Tsuda ................ | H04W 36/0061 |
| 11,140,544 B2* | 10/2021 | Yang ..................... | H04W 48/18 |
| 11,191,016 B2* | 11/2021 | Hwang .................. | H04W 48/10 |
| 11,432,159 B2* | 8/2022 | Buyukdura ......... | H04L 41/0893 |

(Continued)

FOREIGN PATENT DOCUMENTS

| | | | | |
|---|---|---|---|---|
| CN | 1852592 A | 10/2006 | | |
| CN | 109246775 A | * 1/2019 | ............ | H04W 48/20 |

(Continued)

OTHER PUBLICATIONS

Extended European Search Report dated Jan. 2, 2024 received in European Patent Application No. EP1932173.4.

(Continued)

*Primary Examiner* — Eric Nowlin
(74) *Attorney, Agent, or Firm* — Sheppard, Mullin, Richter & Hampton LLP

(57) ABSTRACT

The present disclosure provides a wireless communication method, a terminal device, and a network device, capable of taking into account both the slicing requirement of the terminal device and the coverage of the terminal device. The method includes: performing, by a terminal device, cell selection or cell reselection according to slice information of the terminal device and/or slice information of a network device.

12 Claims, 3 Drawing Sheets

100

(56) References Cited

U.S. PATENT DOCUMENTS

| | | | | |
|---|---|---|---|---|
| 11,539,699 | B2 * | 12/2022 | Kunz | H04W 12/72 |
| 11,812,369 | B2 * | 11/2023 | Park | H04W 48/16 |
| 12,256,279 | B2 * | 3/2025 | Jiang | H04W 48/18 |
| 12,323,864 | B2 * | 6/2025 | Hong | H04W 48/20 |
| 12,432,649 | B2 * | 9/2025 | Jung | H04W 48/18 |
| 2012/0258750 | A1 | 10/2012 | Kim et al. | |
| 2015/0289182 | A1 * | 10/2015 | Peisa | H04W 36/0005 |
| | | | | 370/331 |
| 2019/0174406 | A1 * | 6/2019 | Hwang | H04W 36/08 |
| 2019/0320314 | A1 * | 10/2019 | Yang | H04W 8/245 |
| 2019/0349824 | A1 * | 11/2019 | Tsuda | H04W 36/0085 |
| 2020/0120547 | A1 * | 4/2020 | Han | H04W 36/0083 |
| 2021/0153088 | A1 * | 5/2021 | Jin | H04W 36/0085 |
| 2021/0258865 | A1 * | 8/2021 | Park | H04W 48/16 |
| 2021/0282084 | A1 * | 9/2021 | Catovic | H04W 8/26 |
| 2021/0392501 | A1 * | 12/2021 | Buyukdura | H04L 41/0893 |
| 2022/0124571 | A1 * | 4/2022 | Jung | H04W 48/18 |
| 2022/0303884 | A1 | 9/2022 | Chen et al. | |
| 2022/0394608 | A1 | 12/2022 | Luo et al. | |
| 2022/0400421 | A1 * | 12/2022 | Hong | H04W 48/20 |
| 2023/0037553 | A1 * | 2/2023 | Shih | H04W 36/13 |
| 2023/0056855 | A1 * | 2/2023 | Jiang | H04W 36/302 |
| 2023/0131696 | A1 * | 4/2023 | Choe | H04W 48/18 |
| | | | | 370/332 |
| 2023/0262588 | A1 * | 8/2023 | Gao | H04W 48/12 |
| | | | | 370/331 |
| 2023/0300738 | A1 * | 9/2023 | Liu | H04W 36/08 |
| | | | | 370/329 |
| 2023/0328599 | A1 * | 10/2023 | Fu | H04W 36/08 |
| | | | | 370/331 |
| 2023/0328636 | A1 * | 10/2023 | Fu | H04W 48/18 |
| 2023/0388879 | A1 * | 11/2023 | Fu | H04W 48/16 |
| 2024/0007919 | A1 * | 1/2024 | Liu | H04W 48/18 |
| 2024/0259934 | A1 * | 8/2024 | Choe | H04W 48/12 |

FOREIGN PATENT DOCUMENTS

| | | | | | |
|---|---|---|---|---|---|
| CN | 109392040 | A | | 2/2019 | |
| CN | 111149387 | A | * | 5/2020 | H04W 36/0061 |
| CN | 111386727 | A | * | 7/2020 | H04W 48/18 |
| CN | 111565428 | A | | 8/2020 | |
| CN | 112449387 | A | | 3/2021 | |
| CN | 112492658 | A | | 3/2021 | |
| CN | 109246775 | B | * | 9/2021 | H04W 48/20 |
| CN | 113766588 | A | * | 12/2021 | H04W 48/20 |
| CN | 111149387 | B | * | 7/2022 | H04W 36/0061 |
| CN | 115087059 | A | * | 9/2022 | H04W 36/0061 |
| CN | 113766588 | B | * | 4/2023 | H04W 48/20 |
| CN | 115087059 | B | * | 3/2024 | H04W 4/20 |
| EP | 3589016 | A1 | | 1/2020 | |
| EP | 3589064 | A1 | | 1/2020 | |
| EP | 4096292 | A1 | * | 11/2022 | H04W 48/18 |
| ID | P202207157 | A | * | 11/2022 | |
| JP | 2025085854 | A | * | 6/2025 | H04W 74/0833 |
| WO | WO-2017030713 | A1 | * | 2/2017 | H04W 48/00 |

| | | | | | |
|---|---|---|---|---|---|
| WO | 2018127843 | A1 | | 7/2018 | |
| WO | 2018219352 | A1 | | 12/2018 | |
| WO | 2018226055 | A1 | | 12/2018 | |
| WO | WO-2018228294 | A1 | * | 12/2018 | H04W 48/20 |
| WO | 2020222211 | A1 | | 11/2020 | |
| WO | 2021035449 | A1 | | 3/2021 | |
| WO | 2021043211 | A1 | | 3/2021 | |
| WO | WO-2021077267 | A1 | * | 4/2021 | H04W 36/0061 |
| WO | WO-2021146852 | A1 | * | 7/2021 | H04W 48/18 |
| WO | WO-2022141426 | A1 | * | 7/2022 | H04W 48/12 |
| WO | WO-2022206849 | A1 | * | 10/2022 | H04W 36/00 |

OTHER PUBLICATIONS

China National Intellectual Property Administration, First office action of Chinese application No. 202311407400.X issued on Oct. 10, 2024, which is foreign counterpart application of this US application.

International Search Report and Written Opinion dated Dec. 1, 2021 in International Application No. PCT/CN2021/082895. English translation attached.

"3rd Generation Partnership Project; Technical Specification Group Radio Access Network;NR;User Equipment (UE) procedures in Idle mode and RRC Inactive state (Release 16)", 3GPP TS 38.304 V16.3.0, Dec. 2020.

Oppo. "Consideration on slice-specific cell (re)selection." 3GPP TSG-RAN WG2 Meeting #113-e E-Meeting. R2-2100894., Jan. 15, 2021 (Jan. 15, 2021), section 2.

ITRI. "Assistant information to enable UE fast access network slice. "3GPP TSG-RAN WG2 Meeting #112 electronic Online meeting. R2-2009644., Oct. 23, 2020 (Oct. 23, 2020), section 2.

International search report of PCT application No. PCT/CN2021/ 070969 issued on Sep. 28, 2021.

Oppo, "Consideration on slice-based cell (re)selection", 3GPP TSG-RAN WG2 #112-e E-meeting, R2-2009542, Nov. 16, 2020, full text, section 2.

Vice Chairman (Nokia), "Report on LTE legacy, Mobility, DCCA, Multi-SIM and RAN slicing", 3GPP TSG-RAN WG2 Meeting #112 electronic Online, R2-2010701, Nov. 16, 2020, full text, section 8.8.2, Nov. 2-13, 2020.

Extended European search report of counterpart European application No. 21916851.5 issued on Jan. 17, 2024.

Communication pursuant to Article 94(3) EPC of counterpart European application No. 21916851.5 issued on Aug. 13, 2024.

First office action of Chinese application No. 202311416085.7 issued on Jan. 23, 2025.

Communication pursuant to Article 94(3) EPC of counterpart European application No. 21916851.5 issued on Feb. 21, 2025.

"3rd Generation Partnership Project; Technical Specification Group Radio Access" Network; NR; Radio Resource Control (RRC) protocol specification (Release 16), 3GPP TS 38.331 V16.2.0 (Sep. 2020), Sep. 2020. Entire document.

Non-final office Action of U.S. Appl. No. 18/329,753 issued on Nov. 5, 2025.

* cited by examiner

100

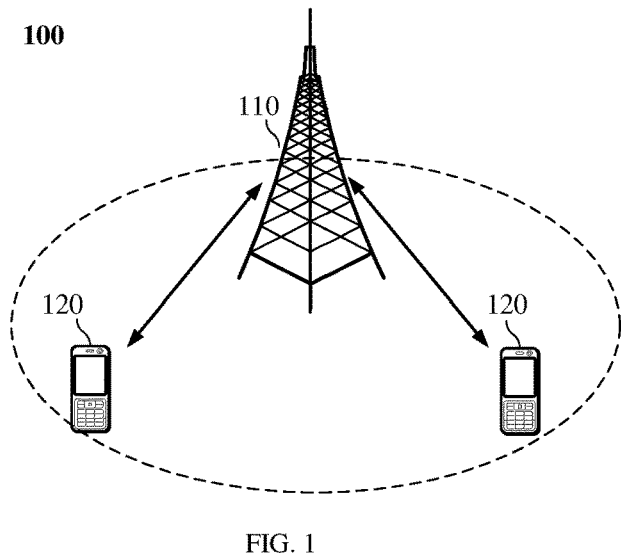

| |
|---|
| Performing, by a terminal device, cell selection or cell reselection according to slice information of the terminal device and/or slice information of a network device |

| |
|---|
| Determining, by the terminal device, a target criterion for performing the cell selection or cell reselection according to the slice information of the terminal device and/or the slice information of the network device |

S211

| |
|---|
| Performing, by the terminal device, the cell selection or cell reselection according to the target criterion |

| |
|---|
| Performing, by the terminal device, the cell selection or cell reselection according to the first criterion |

S213

S214

| Falling back to cell selection or cell reselection according to a second criterion, when a result of the cell selection or reselection satisfies a third condition |
|---|

S215

| Determining a target cell from candidate cells determined according to the first criterion, when the result of the cell selection or reselection satisfies the third condition |
|---|

| Transmitting, by a network device, indication information to a terminal device, the indication information indicating a scheme for the terminal device to perform cell selection or cell reselection | S310 |

Terminal Device 400

Processing Unit 410

Network Device 500

Communication Unit 510

Communication Device 600

Memory 620

Processor 610

Transceiver 630

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2021/082895 filed on Mar. 25, 2021, the entire disclosure of which is incorporated herein by reference.

TECHNICAL FIELD

The embodiments of the present disclosure relate to communication technology, and more particularly, to a wireless communication method, a terminal device and a network device.

BACKGROUND

In order to satisfy the needs of vertical industries with respect to latency, mobility, reliability, and location accuracy, it is considered to provide services having different requirements with lower latency, more targeted, greater flexibility, and higher scalability based on network slicing.

Due to mobility, a terminal device can perform cell selection or cell reselection. When the cell selection or cell reselection is performed based on channel quality, the selected or reselected cell may not support the slice required by the terminal device (or UE intended slice), and the cell where the terminal device is currently located may support the slice required by the terminal device. When the cell selection or reselection is performed based on slice, the terminal device may select a cell that supports the slice required by the terminal device, but at the same time, the terminal device may lose coverage. Therefore, how to take into account both the slicing requirement of the terminal device and the coverage of the terminal device is a problem to be solved.

SUMMARY

The present disclosure provides a wireless communication method, a terminal device, and a network device, capable of taking into account both the slicing requirement of the terminal device and the coverage of the terminal device.

In a first aspect, a wireless communication method is provided. The method includes: performing, by a terminal device, cell selection or cell reselection according to slice information of the terminal device and/or slice information of a network device.

In a second aspect, a wireless communication method is provided. The method includes: transmitting, by a network device, indication information to a terminal device, the indication information indicating a scheme for the terminal device to perform cell selection or cell reselection.

In a third aspect, a terminal device is provided. The terminal device is configured to perform the method according to the above first aspect or any implementation thereof.

In particular, the terminal device includes one or more functional modules configured to perform the method according to any of the above first aspect or any implementation thereof.

In a fourth aspect, a network device is provided. The network device is configured to perform the method according to the above second aspect or any implementation thereof.

In particular, the network device includes one or more functional modules configured to perform the method according to the above second aspect or any implementation thereof.

In a fifth aspect, a terminal device is provided. The terminal device includes a processor and a memory. The memory has a computer program stored thereon, and the processor is configured to invoke and execute the computer program stored in the memory to perform the method according to any of the above first aspect or any implementation thereof.

In a sixth aspect, a network device is provided. The network device includes a processor and a memory. The memory has a computer program stored thereon, and the processor is configured to invoke and execute the computer program stored in the memory to perform the method according to the above second aspect or any implementation thereof.

In a seventh aspect, a chip is provided. The chip is configured to perform the method according to any of the above first and second aspects or any implementation thereof.

In particular, the chip includes a processor configured to invoke and execute a computer program from a memory, to cause a device provided with the apparatus to perform the method according to any of the above first and second aspects or any implementation thereof.

In an eighth aspect, a computer-readable storage medium is provided. The computer-readable storage medium stores a computer program that causes a computer to perform the method according to any of the above first and second aspects or any implementation thereof.

In a ninth aspect, a computer program product is provided. The computer program product includes computer program instructions that cause a computer to perform the method according to any of the above first and second aspects or any implementation thereof.

In a tenth aspect, a computer program is provided. The computer program, when executed on a computer, causes the computer to perform the method according to any of the above first and second aspects or any implementation thereof.

With the above technical solution, the terminal device can perform cell selection or reselection based on the slice information required by the terminal device and the slice information supported by the network device. For example, when the slice information supported by the network device matches the slice information required by the terminal device, the slice-based cell selection or reselection criterion is given priority in cell selection or reselection, which facilitates satisfying the slicing requirement of the terminal device. When the slice information supported by the network device does not match the slice information required by the terminal device, the channel quality based cell selection or reselection criterion is given priority in cell selection or reselection, which facilitates preventing the terminal device from losing coverage.

Alternatively, the cell selection or reselection can be performed based on the first criterion first, and if no suitable cell can be selected, the cell selection or reselection may continue based on the first criterion to select an acceptable cell from unsuitable cells, which facilitates guaranteeing the slicing requirement of the terminal device, or may fall back to the second criterion, which facilitates preventing the terminal device from losing coverage.

BRIEF DESCRIPTION OF DRAWINGS

FIG. 1 is a schematic diagram showing an architecture of a communication system according to an embodiment of the present disclosure.

FIG. 2 is a schematic flowchart illustrating a wireless communication method according to an embodiment of the present disclosure.

FIG. 3 is a schematic flowchart illustrating another wireless communication method according to an embodiment of the present disclosure.

FIG. 4 is a schematic flowchart illustrating yet another wireless communication method according to an embodiment of the present disclosure.

DESCRIPTION OF EMBODIMENTS

Figures 5, 6, 7, 8:
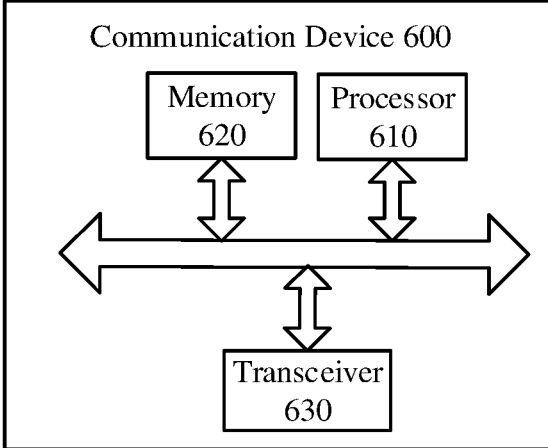
FIG. 5 is a schematic flowchart illustrating still another wireless communication method according to an embodiment of the present disclosure.
FIG. 6 is a schematic block diagram of a terminal device according to an embodiment of the present disclosure.
FIG. 7 is a schematic block diagram of a network device according to an embodiment of the present disclosure.
FIG. 8 is a schematic block diagram of a communication device according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices.

The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system 100 in which an embodiment of the present disclosure can be applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to facilitate understanding of the technical solutions of the embodiments of the present disclosure, the technical solutions of the present disclosure will be described in detail below with reference to specific embodiments. As optional solutions, the related technologies below may be combined with the technical solutions of the embodiments of the present disclosure arbitrarily, and all of these combinations belong to the protection scope of the embodiments of the present disclosure. The embodiments of the present disclosure include at least part of the following content.

In order to satisfy the needs of vertical industries with respect to latency, mobility, reliability, and location accuracy, it is desired to enhance support of vertical services in an Access Network (RAN). One way is to provide services having different requirements with lower latency, more targeted, greater flexibility, and higher scalability based on network slicing. More specifically, slicing at the RAN can enable application providers to participate in design, deployment, and operation of a customized RAN to better support the application provider's services.

Due to mobility, a terminal device can perform cell selection or cell reselection. When the cell selection or cell reselection is performed based on channel quality, the selected or reselected cell may not support the slice required by the terminal device (or UE intended slice), and the cell where the terminal device is currently located may support the slice required by the terminal device. When the cell selection or reselection is performed based on slice, the terminal device may select a cell that supports the slice required by the terminal device, but at the same time, the terminal device may lose coverage. Therefore, how to take into account both the slicing requirement of the terminal device and the coverage of the terminal device is a problem to be solved.

FIG. 2 is a schematic flowchart illustrating a wireless communication method 200 according to an embodiment of the present disclosure. The method 200 can be performed by a terminal device in the communication system shown in FIG. 1. As shown in FIG. 2, the method 200 includes the following content.

At S210, a terminal device performs cell selection or cell reselection according to slice information of the terminal device and/or slice information of a network device.

In some embodiments of the present disclosure the slice information of the terminal device may include at least one of:

whether the terminal device supports slicing;

whether the terminal device has obtained slice information required by the terminal device;

whether the terminal device has obtained slice information supported by the network device; or the slice information required by the terminal device.

It should be understood that the above slice information of the terminal device is only an example. In other embodiments, the slice information of the terminal device may also include other slice information related to the terminal device. For example, the slice information of the terminal device may include whether the terminal device has a slicing requirement, such as whether the terminal device needs to support a vertical service based on slicing.

In some embodiments, the slice information required by the terminal device may be obtained by an Access Stratum (AS) of the terminal device from a Non-Access Stratum (NAS) of the terminal device.

That is, the AS of the terminal device can perform cell selection or cell reselection according to the slice information required by the terminal device and the slice information supported by the network device.

In some embodiments, the slice information supported by the network device may be obtained by the terminal device from the network device. For example, the terminal device may obtain it via at least one of the following signaling: System Information Block (SIB) or dedicated signaling. Optionally, the terminal device may obtain the slice information supported by the network device from the network device via other signaling, such as NAS signaling, and the present disclosure is not limited to this.

Optionally, the dedicated signaling may include, but not limited to, e.g., Radio Resource Control (RRC) signaling.

In some embodiments, the slice information required by the terminal device may include at least one of:

a slice identifier corresponding to a slice required by the terminal device;

a slice group identifier corresponding to the slice required by the terminal device; or a parameter corresponding to the slice required by the terminal device.

In some embodiments, the slice identifier corresponding to the slice required by the terminal device may include, but not limited to, at least one of: Slice/Service Type (SST), Single-Network Slice Selection Assistance Information (S-NSSAI), or slice index.

Optionally, the slice group identifier corresponding to the slice required by the terminal device may include, but not limited to, a slice group index.

Optionally, the parameter corresponding to the slice required by the terminal device may include, but not limited to, e.g., an Access Category (AC) parameter.

In some embodiments of the present disclosure, the slice information of the network device may include at least one of:

whether the network device supports slicing; or slice information supported by the network device.

In some embodiments, the slice information supported by the network device may include at least one of:

a slice identifier corresponding to a slice supported by the network device;

a slice group identifier corresponding to the slice supported by the network device;

a parameter corresponding to the slice supported by the network device;

a frequency point priority corresponding to the slice supported by the network device; or a cell selection parameter or a cell reselection parameter corresponding to the slice supported by the network device.

Optionally, the slice identifier corresponding to the slice supported by the network device may include, but not limited to, at least one of: SST, S-NSSAI, slice index.

Optionally, the slice group identifier corresponding to the slice supported by the network device may include, but not limited to, a slice group index.

Optionally, the parameter corresponding to the slice supported by the network device may include, but not limited to, e.g., an AC parameter.

Optionally, the cell selection parameter or cell reselection parameter corresponding to the slice supported by the network device may include, but not limited to, e.g., a cell selection or reselection threshold and/or a time length threshold corresponding to the slice.

It should be understood that the content included in the slice information of the network device described above is only an example. In other embodiments, the slice information of the network device may also include other slice-related information. For example, the slice information of the network device may include whether the network device supports a slice-based cell selection or reselection criterion, or whether the network device allows the terminal device to perform cell selection or reselection based on the slice-based cell selection or reselection criterion, and the present disclosure is not limited thereto.

Optionally, in a subsequent process of random access (RACH), a slice-based RACH parameter can also be configured, including but not limited to, slice-based RACH and non-slice-based RACH selection parameters, slice-based two-step (2-step) RACH and slice-based four-step (4-step) RACH selection parameters, non-slice-based 2-step RACH and non-slice-based 2-step RACH (common 2-step RACH) selection parameters, and slice-based 4-step RACH and non-sliced 4-step RACH (common 4-step RACH) selection parameters.

It should be understood that, in an embodiment of the present disclosure, the terminal device may select a RACH mode based on the above RACH parameters. In other embodiments, the terminal device may also determine a target RACH mode according to an indication from the network device. In this case, the RACH parameter corresponding to the target RACH mode may be configured by the network device, or may be predefined.

Optionally, RACH parameters for different slices may be the same or different.

Optionally, a RACH parameter for a slice may include at least one of (for selection):

preamble received target power (preambleReceivedTargetPower), message A preamble received power (msgA-PreambleReceivedTargetPower), Synchronization Signal/Physical Broadcast Channel Block (SS/PBCH block, or SSB) RSRP threshold (rsrp-ThresholdSSB), Channel State Information Reference Signal (CSI-RS) RSRP threshold (rsrp-ThresholdCSI-RS), RSRP threshold for msgA SSB (msgA-RSRP-ThresholdSSB), RSRP threshold for Supplementary uplink (SUL) SSB (rsrp-ThresholdSSB-SUL), RSRP threshold for msgA (msgA-RSRP-Threshold), maximum number of transmissions for message A (msgA-Trans-Max), candidate beam reference signal list (candidate-BeamRSList), random access occasion list (ra-OccasionList), random access preamble start index (ra-PreambleStartIndex), preamble (preambleTransMax), number of SSBs per RACH occasion and number of contention-based preambles for one SSB (ssb-per-RACH-OccasionAndCB-PreamblesPerSSBB), number of contention-based preambles for message A per shared RO per SSB (msgA-CB-PreamblesPerSSB-Per-SharedRO), number of messages A and SSBs per RO and number of contention-based preambles per SSB (msgA-SSB-PerRACH-OccasionAndCB-Preambles-PerSSB), Physical Uplink Shared Channel (PUSCH) resource group A for message A (msgA-PUSCH-ResourceGroupB msgA-PUSCH-ResourceGroupA), msgA-PUSCH-ResourceGroupB, or PUSCH resource index for message A (msgA-PUSCH-Resource-Index).

Optionally, the terminal device may first determine whether to use slice-based random access or non-slice-based random access, and then determine whether to use 2-step RACH or 4-step RACH. Alternatively, the UE may first determine whether to use 2-step RACH or 4-step RACH, and then determine whether to use slice-based RACH or non-slice-based RACH.

Optionally, the terminal device may first determine whether to use slice-based random access or non-slice-based random access, and then determine whether to select UL or SUL. Alternatively, the UE may first determine whether to select UL or SUL, and then determine whether to use slice-based random access or non-slice-based random access. Furthermore, if UL or SUL is selected first, after selecting UL/SUL and determining the slice, the UE then determines whether to use 2-step RACH or 4-step RACH. Alternatively, if UL or SUL is selected first, after selecting UL/SUL and determining whether to use 2-step RACH or 4-step RACH, the UE then determines whether to use slice-based random access or non-slice-based random access.

Optionally, in some embodiments of the present disclosure, as shown in FIG. 3, S210 may include:

At S211, the terminal device determines a target criterion for performing the cell selection or cell reselection according to the slice information of the terminal device and/or the slice information of the network device.

At S212, the terminal device performs the cell selection or cell reselection according to the target criterion.

Therefore, in the embodiment of the present disclosure, the terminal device may first determine the target criterion for performing the cell selection or cell reselection based on the slice information of the terminal device and/or the slice information of the network device, and further perform the cell selection or cell reselection based on the target criterion, which facilitates taking into account both the slicing requirement of the terminal device and the coverage of terminal device.

For the purpose of distinguishing and description, the cell selection or reselection scheme in which the target criterion for performing cell selection or cell reselection is determined according to the slice information of the terminal device and/or the slice information of the network device and the cell selection or cell reselection is further performed according to the target criterion is denoted as Scheme 1.

In some embodiments, the network device may configure the scheme for the terminal device to perform cell selection or reselection. For example, the network device may transmit first instruction information to the terminal device, and the first instruction information is used to instruct the terminal device to perform cell selection or cell reselection according to the above Scheme 1.

That is, the terminal device may perform cell selection or reselection in the above Scheme 1 based on the instruction of the network device.

In some other embodiments, the terminal device may decide to perform cell selection or reselection based on Scheme 1 autonomously or as predefined. As an example, the terminal device may perform cell selection or reselection based on Scheme 1 when there is a slicing requirement. As another example, it may be predefined that a terminal device supporting a slicing service performs cell selection or reselection based on Scheme 1. For example, the cell selection or reselection scheme may be set as Scheme 1 in a terminal device supporting the slicing service.

In other words, the above Scheme 1 may correspond to a specific terminal, for example, a terminal device supporting slicing, or a terminal device supporting a specific service that needs a slicing-based service, such as an Internet of Things (IoT) service, e.g., a UE of a specific release, for example, a UE that supports Release 17 (R17) or a later release. In some embodiments, the terminal device may determine a target criterion for performing cell selection or reselection from a first criterion and a second criterion according to the slice information of the terminal device and/or the slice information of the network device.

Optionally, the first criterion may be a slice-based cell selection or cell reselection criterion. For example, the first criterion may indicate to perform cell selection or cell reselection based on the slice information of the terminal device and/or the slice information of the network device.

It should be understood that slice-based cell selection or cell reselection criterion may mean that the cell selection or reselection is performed based at least on slicing, but does not mean that the cell selection or reselection is performed based only on slicing. For example, when the cell selection or reselection is performed based on the first criterion, the cell selection or reselection may be performed based on the slice information of the terminal device and/or slice information of the network device, and other information such as channel quality information of cells.

Optionally, when the cell selection or reselection is performed based on the first criterion, the priority of slicing may be higher than that of channel quality. For example, cells that support the slice information required by the terminal device may be selected with a high priority, and further, from the cells that support the slice information required by the terminal device, the cell selection or reselection may be performed according to channel quality information of the cells.

Optionally, when the cell selection or reselection is performed based on the first criterion, the priority of channel quality may be higher than that of slicing. For example, cells having channel quality satisfying a certain condition (e.g., higher than a certain threshold) may be selected with a high priority, and further the cell selection or reselection may be performed according to the slice information required by the terminal device. For example, a cell having the channel quality satisfying the condition and supporting the slice information required by the terminal device may be selected.

Optionally, the second criterion may be a cell selection or cell reselection criterion not based on slicing. For example, the second criterion may indicate not to perform the cell selection or cell reselection based on the slice information of the terminal device and/or the slice information of the network device.

For example, when the cell selection or reselection is performed based on the second criterion, the cell selection or reselection may be performed based on other information such as channel quality information of cells, instead of the slice information of the terminal device and/or slice information of the network device.

In some embodiments, the second criterion may be an existing cell selection or reselection criterion, or an R16 cell selection or cell reselection criterion, e.g., S criterion or R criterion, etc.

In some embodiments of the present disclosure, the terminal device may determine that the target criterion for performing the cell selection or cell reselection is the first criterion when a first condition is satisfied.

Optionally, in some embodiments, the first condition may include, but not limited to, at least one of:
the terminal device supporting slicing;
the terminal device having obtained slice information required by the terminal device; or
the slice information required by the terminal device matching slice information supported by the network device.

Therefore, in the embodiment of the present disclosure, when the terminal device supports slicing, and the slice information required by the terminal device matches the slice information supported by the network device, the cell selection or reselection can be performed based on the first criterion (that is, the slice-based cell selection or reselection criterion), which facilitates satisfying the slicing requirement of the terminal device.

Optionally, the slice information required by the terminal device matching the slice information supported by the network device may include one of the following cases.

Case 1: The slices supported by the network device include all the slices required by the terminal device.

Optionally, the slices supported by the network device including all the slices required by the terminal device may include at least one of the following situations:
slice identifiers corresponding to the slices supported by the network device include slice identifiers corresponding to all the slices required by the terminal device;
slice group identifiers corresponding to the slices supported by the network device include slice group identifiers corresponding to all the slices required by the terminal device; or
parameters corresponding to the slices supported by the network device include parameters corresponding to all the slices required by the terminal device.

Case 2: The slices supported by the network device are at least partially the same as the slices required by the terminal device.

Optionally, the slices supported by the network device being at least partially the same as the slices required by the terminal device may include at least one of the following situations:

slice identifiers corresponding to the slices supported by the network device are at least partially the same as the slice identifiers corresponding to the slices required by the terminal device;
slice group identifiers corresponding to the slices supported by the network device are at least partially the same as the slice group identifiers corresponding to the slices required by the terminal device; or parameters corresponding to the slices supported by the network device are at least partially the same as the parameters corresponding to the slices required by the terminal device.

In some other embodiments, the terminal device performing the cell selection or reselection based on the first criterion may be determined according to a scenario or a location, e.g., when the terminal device is located at the edge of different Tracking Areas (TAs) or Registering Areas (RAs). Optionally, different TAs or RAs may support different slices. The different TAs or RAs supporting different slices may include at least one of: supporting different slice identifiers, different frequency points corresponding to the slices, or different frequency point priorities corresponding to the slices.

Optionally, in some embodiments, the method 200 may further include:
determining, by the terminal device, that a cell satisfying at least one of the following conditions is a suitable cell and/or performing a normal service in the suitable cell:
supporting slicing;
supporting slice information required by the terminal device; or
the slice information required by the terminal device matching slice information supported by the network device.

For example, when the terminal device uses the first criterion to perform cell selection or reselection, it may consider a cell that supports the intended slice of the terminal device or a cell where the supported slice of the network device matches the intended slice of the terminal device as a suitable cell, and further perform the normal service in the suitable cell.

Optionally, the normal service may include, but not limited to:
a service related to the slice required by the terminal device, a service not related to the slice required by the terminal device, such as an emergency service, etc.

For example, the terminal device can establish a Protocol Data Unit (PDU) session corresponding to the slice required by the terminal device in the suitable cell, and activate the PDU Session on the user plane, such that the terminal device can perform the service related to the slice required by the terminal device based on the PDU session.

Optionally, in some embodiments, the method 200 may further include:
determining, by the terminal device, that a cell satisfying at least one of the following conditions is an acceptable cell and/or performing a limited service in the acceptable cell:
supporting slicing;
not supporting slice information required by the terminal device; or
the slice information required by the terminal device not matching slice information supported by the network device.

For example, when the terminal device uses the first criterion to perform cell selection or reselection, if there is no suitable cell as described above, it may be considered that a cell not supporting the intended slice of the terminal device or a cell where the supported slice of the network device does not match the intended slice of the terminal device is an acceptable cell, and may further perform the limited service in the acceptable cell.

Optionally, the limited service may include a service that is not related to the slice required by the terminal device, such as an emergency service.

Optionally, the terminal device can establish a PDU session corresponding to the slice required by the terminal device in the acceptable cell, without activating the PDU session on the user plane, or the terminal device may not establish a PDU session corresponding to the slice required by the terminal device in the acceptable cell.

Optionally, the slice information required by the terminal device not matching the slice information supported by the network device may include one of the following cases:

Case 1: The slices supported by the network device do not include any slice required by the terminal device.

Optionally, the slices supported by the network device not including any slice required by the terminal device may include at least one of the following situations:

slice identifiers corresponding to the slices required by the terminal device are completely different from slice identifiers corresponding to the slices supported by the network device;

slice group identifiers corresponding to the slices required by the terminal device are completely different from slice group identifiers corresponding to the slices supported by the network device; or parameters corresponding to the slices required by the terminal device are completely different from parameters corresponding to the slices supported by the network device.

Case 2: The slices supported by the network device are at least partially different from the slices required by the terminal device.

Optionally, the slices supported by the network device being at least partially different from the slices required by the terminal device may include at least one of the following situations:

slice identifiers corresponding to the slices supported by the network device are at least partially different from slice identifiers corresponding to the slices required by the terminal device;

slice group identifiers corresponding to the slices supported by the network device are at least partially different from slice group identifiers corresponding to the slices required by the terminal device; or parameters corresponding to the slices supported by the network device are at least partially different from parameters corresponding to the slices required by the terminal device.

In some embodiments of the present disclosure, the terminal device determining the target criterion for performing the cell selection or cell reselection according to the slice information of the terminal device and/or the slice information of the network device may include:

the terminal device determining, when a second condition is satisfied, that the target criterion for performing the cell selection or cell reselection is a second criterion.

Optionally, in some embodiments, the second condition may include, but not limited to, at least one of:

the terminal device not supporting slicing;

the terminal device having not obtained slice information required by the terminal device;

the slice information required by the terminal device not matching slice information supported by the network device;

the network device not supporting slicing; or the network device not supporting the slice information required by the terminal device.

Therefore, in the embodiment of the present disclosure, if the terminal device does not support slicing, or the slice information required by the terminal device does not match the slice information supported by the network device, the slicing requirement of the terminal device may not be considered in this case. Therefore, the cell selection or reselection may be performed based on the second criterion, that is, not based on slicing. For example, the cell selection or reselection may be performed based on an existing cell selection or reselection criterion (that is, based on channel quality), which facilitates preventing the terminal device from losing coverage.

It should be understood that, for the scheme for determining that the slice information required by the terminal device does not match the slice information supported by the network device, reference can be made to the relevant description above, and details thereof will be omitted for brevity.

Optionally, in some embodiments, the method 200 may further include:

determining, by the terminal device, that a cell satisfying at least one of the following conditions is a suitable cell and/or performing a normal service in the suitable cell:

not supporting slicing;

not supporting slice information required by the terminal device; or the slice information required by the terminal device not matching slice information supported by the network device.

For example, when the terminal device uses the second criterion to perform cell selection or reselection, it may consider a cell that does not support the intended slice of the terminal device or a cell where the supported slice of the network device does not match the intended slice of the terminal device as a suitable cell, and further perform the normal service in the suitable cell.

Optionally, the normal service may include, but not limited to: a service not related to the slice required by the terminal device, such as an emergency service.

Optionally, the terminal device can establish a PDU session corresponding to the slice required by the terminal device in the suitable cell, and activate the PDU Session on the user plane, or the terminal device may not establish the PDU session corresponding to the slice required by the terminal device in the suitable cell.

Optionally, in other embodiments, the method 200 may further include:

determining, by the terminal device, that a cell satisfying at least one of the following conditions is an acceptable cell and/or performing a limited service in the acceptable cell:

not supporting slicing;

not supporting slice information required by the terminal device; or the slice information required by the terminal device not matching slice information supported by the network device.

For example, when the terminal device uses the second criterion to perform cell selection or reselection, if no suitable cell is selected, it may be considered that a cell not supporting the intended slice of the terminal device or a cell where the supported slice of the network device does not match the intended slice of the terminal device is an acceptable cell, and may further perform the limited service in the acceptable cell.

Optionally, the limited service may include, but is not limited to: a service not related to the slice required by the terminal device, such as an emergency service.

Optionally, the terminal device can establish a PDU session corresponding to the slice required by the terminal device in the acceptable cell, without activating the PDU session on the user plane, or the terminal device may not establish a PDU session corresponding to the slice required by the terminal device in the acceptable cell.

In other embodiments of the present disclosure, as shown in FIG. 4, S210 may include:

At S213, the terminal device performs the cell selection or cell reselection according to the first criterion.

In some embodiments, the priority of the first criterion is higher than that of the second criterion, that is, the terminal device preferentially chooses to perform cell selection or cell reselection according to the first criterion.

For the purpose of distinguishing and description, in the embodiment of the present disclosure, the scheme in which the cell selection or cell reselection is preferentially performed according to the first criterion is denoted as Scheme 2.

Optionally, in some embodiments, the network device may configure the scheme for the terminal device to perform cell selection or reselection. For example, the network device may transmit second instruction information to the terminal device, and the second instruction information is used to instruct the terminal device to perform cell selection or cell reselection according to Scheme 2.

That is, the terminal device can perform cell selection or reselection in Scheme 2 based on the instruction from the network device.

In some other embodiments, the terminal device may decide to perform cell selection or reselection based on Scheme 2 autonomously or as predefined. As an example, the terminal device may perform cell selection or reselection based on Scheme 2 when there is a slicing requirement. As another example, it may be predefined that a terminal device supporting a slicing service performs cell selection or reselection based on Scheme 2. For example, the cell selection or reselection scheme may be set as Scheme 2 in a terminal device supporting the slicing service.

In other words, the above Scheme 2 may correspond to a specific terminal, for example, a terminal device supporting slicing, or a terminal device supporting a specific service that needs a slicing-based service, such as an IOT service, e.g., a UE of a specific release, for example, a UE that supports Release 17 (R17) or a later release.

In some other embodiments, the terminal device performing the cell selection or reselection based on Scheme 2 may be determined according to a scenario or a location, e.g., when the terminal device is located at the edge of different TAs or RAs. Optionally, different TAs or RAs may support different slices. The different TAs or RAs supporting different slices may include at least one of: supporting different slice identifiers, different frequency points corresponding to the slices, or different frequency point priorities corresponding to the slices.

Further, if the terminal device performs cell selection or cell reselection based on the first criterion and fails to select a suitable cell, the terminal device may choose to fall back to the second criterion to perform cell selection or cell reselection, or the terminal device may select an acceptable cell from unsuitable cells.

For the purpose of distinguishing and description, the scheme in which the terminal device performs cell selection or cell reselection according to the first criterion and fails to select a suitable cell (for example, the cell selection or reselection satisfies a third condition), and falls back to the second criterion to perform cell selection or cell reselection, or selects an acceptable cell from unsuitable cells is denoted as Scheme 3.

In some embodiments, whether the terminal device performs cell selection or reselection based on Scheme 2 or Scheme 3 may be based on an instruction from the network device.

In some embodiments, the terminal device may perform the cell selection or reselection based on Scheme 3 according to an instruction from the network device. For example, the terminal device may receive third instruction information transmitted by the network device, and the third indication information is used to instruct the terminal device to fall back to the second criterion to perform cell selection or cell reselection, or determining a target cell, i.e., an acceptable cell, from unsuitable cells, when no suitable cell is selected by performing cell selection or cell reselection according to the first criterion.

In some other embodiments, the terminal device may decide to perform cell selection or reselection based on Scheme 3 autonomously or as predefined. As an example, the terminal device may perform cell selection or reselection based on Scheme 3 when there is a slicing requirement. As another example, it may be predefined that a terminal device supporting a slicing service performs cell selection or reselection based on Scheme 3. For example, the cell selection or reselection scheme may be set as Scheme 3 in a terminal device supporting the slicing service.

In other words, the above Scheme 3 may correspond to a specific terminal, for example, a terminal device supporting slicing, or a terminal device supporting a specific service that needs a slicing-based service, such as an IoT service, e.g., a UE of a specific release, for example, a UE that supports Release 17 (R17) or a later release.

Optionally, in some embodiments of the present disclosure, the first criterion may include at least one of the following cell selection or reselection parameters:

a first cell selection or reselection threshold corresponding to the slice supported by the network device, a second cell selection or reselection threshold, a first time length corresponding to the slice supported by the network device, or a second time length.

Optionally, the first cell selection or reselection threshold may be greater than the second cell selection or reselection threshold, and the first time length may be shorter than the second time length.

Optionally, the first cell selection or reselection threshold and/or the first time length may be parameters for the terminal device to select a suitable cell.

Optionally, the second cell selection or reselection threshold and/or the second time length may be parameters for the terminal device to select an acceptable cell.

For example, if there is no cell having channel quality higher than or equal to the first cell selection or reselection threshold, the terminal device may perform cell selection or reselection according to the second cell selection or reselection threshold, or when channel quality of a cell is lower than or equal to the first cell selection or reselection threshold for the first time length, the terminal device may perform cell selection or reselection based on the second time length and/or the second cell selection or reselection threshold.

Optionally, in other embodiments, the second cell selection or reselection threshold may be a cell selection or reselection threshold corresponding to the second criterion, or the second cell selection or reselection threshold may be an independent threshold that does not correspond to the first criterion or the second criterion, or a predefined threshold that is used to select an acceptable cell when the terminal device fails to select a suitable cell.

In some embodiments of the present disclosure, as shown in FIG. 4, S210 may further include:

at S214, when a result of the cell selection or reselection based on the first criterion satisfies a third condition, performing cell selection or cell reselection according to the second criterion.

That is, the terminal device may fall back to the second criterion to perform cell selection or reselection when the cell selection or reselection result obtained by performing cell selection or reselection according to the first criterion satisfies the third condition.

Optionally, the cell selection or reselection result satisfying the third condition may include at least one of:

Condition 3.1: channel quality of a cell being low;

Condition 3.2: candidate cells determined according to the first criterion not satisfying a slicing condition;

Condition 3.3: candidate cells determined according to the first criterion not supporting the first criterion.

Optionally, for condition 3.1, the channel quality of the cell may include channel quality of a serving cell and/or channel quality of a neighboring cell.

Optionally, the channel quality of the cell being low may include at least one of the following situations:

the channel quality of the serving cell being lower than or not higher than the first cell selection or reselection threshold corresponding to the slice of the network device;

the channel quality of the neighboring cell being lower than or not higher than the first cell selection or reselection threshold corresponding to the slice of the network device;

the channel quality of the serving cell being lower than or not higher than the first cell selection or reselection threshold corresponding to the slice of the network device for a time length greater than or equal to the first time length; or the channel quality of the neighboring cell being lower than or not higher than the first cell selection or reselection threshold corresponding to the slice of the network device for a time length greater than or equal to the first time length.

For Condition 3.2, the candidate cells determined according to the first criterion not satisfying the slicing condition may include at least one of:

the candidate cells determined according to the first criterion not supporting slicing;

no slice supported by the candidate cells determined according to the first criterion matching the slice required by the terminal device; or the candidate cells determined according to the first criterion not supporting the slice required by the terminal device.

Optionally, for the specific implementation of the slices supported by the candidate cells not matching the slice required by the terminal device, reference can be made to the relevant description of the slice supported by the network device not matching the slice required by the terminal device, and details thereof will be omitted here for brevity.

For example, the candidate cells determined according to the first criterion not supporting the slice required by the terminal device may include the candidate cells not supporting all the slices required by the terminal device, or the candidate cells not supporting at least one slice required by the terminal device.

Optionally, for Condition 3.3, the candidate cells determined according to the first criterion not supporting the first criterion may include the candidate cells not supporting the first criterion, or the candidate cells being indicated as not supporting the first criterion.

For example, when a candidate cell does not support slicing, the candidate cell may be indicated as not supporting the first criterion. Alternatively, when a candidate cell does not support slicing, the candidate cell does not support the first criterion.

In some embodiments of the present disclosure, when at least one of the above Conditions 3.1 to 3.3 is satisfied, the terminal device may fall back to the second criterion to perform cell selection or reselection.

In some embodiments, if the channel quality of the cell is low (that is, Condition 3.1 is established), but the candidate cells satisfy the slicing condition (that is, Condition 3.2 is not established), then the terminal device can fall back to the second criterion to perform cell selection or reselection.

For example, if the candidate cells support slicing, or the candidate cells support the slice required by the terminal device, or the slices supported by the candidate cells match the slice required by the terminal device, and the channel quality of the serving cell and/or neighboring cell is lower than or not higher than the first cell selection or reselection threshold corresponding to the slice of the network device, in this case the terminal device may fall back to the second criterion to perform cell selection or reselection.

In another example, if the candidate cells support slicing, or the candidate cells support the slice required by the terminal device, or the slices supported by the candidate cells match the slice required by the terminal device, and the channel quality of the serving cell and/or neighboring cell is lower than or not higher than the first cell selection or reselection threshold corresponding to the slice of the network device for a time length greater than or equal to the first time length, in this case the terminal device may fall back to the second criterion to perform cell selection or reselection.

In some other embodiments, if the candidate cells do not satisfy the slicing condition (that is, Condition 3.2 is established), but the channel quality of the cell is high (that is, Condition 3.1 is not established), then the terminal device can fall back to the second criterion to perform cell selection or reselection.

For example, if the candidate cells do not support slicing, or the candidate cells do not support the slice required by the terminal device, or the slices supported by the candidate cells do not match the slice required by the terminal device, but the channel quality of the cell is higher than or equal to the first cell selection or reselection threshold corresponding to the slice of the network device, in this case the terminal device can fall back to the second criterion to perform cell selection or reselection.

In another example, if the candidate cells do not support slicing, or the candidate cells do not support the slice required by the terminal device, or the slices supported by the candidate cells do not match the slice required by the terminal device, and the channel quality of the candidate cells is higher than or equal to the first cell selection or reselection threshold corresponding to the slice of the network device for a time length greater than or equal to the first time length, in this case the terminal device can fall back to the second criterion to perform cell selection or reselection.

In some other embodiments, if the channel quality of the cell is high (that is, Condition 3.1 is not established), the candidate cells satisfy the slicing condition (that is, Condition 3.2 is not established), but the candidate cells do not support the first criterion (that is, Condition 3.3 is established), then the terminal device may fall back to the second criterion to perform cell selection or reselection.

For example, if the candidate cells support slicing, or the candidate cells support the slice required by the terminal device, or the slices supported by the candidate cells match the slice required by the terminal device, and the channel quality of the candidate cells is higher than or equal to the first cell selection or reselection threshold corresponding to the slice of the network device, or the channel quality of the candidate cells is higher than or equal to the first cell selection or reselection threshold corresponding to the slice of the network device for a time length greater than or equal to the first time length, but the candidate cells do not support the first criterion, in this case the terminal device may fall back to the second criterion to perform cell selection or reselection.

In other embodiments of the present disclosure, as shown in FIG. 4, S210 may further include:

at S215, when the result of the cell selection or reselection based on the first criterion satisfies the third condition, determining a target cell for cell selection or reselection from candidate cells determined according to the first criterion.

Optionally, in some embodiments, the candidate cells determined according to the first criterion may include all cells measured by the terminal device, or may include cells that satisfy some of the conditions in the first criterion, and the present disclosure is not limited to this.

In some embodiments of the present disclosure, when the cell selection or reselection is further performed to determine the target cell from the candidate cells determined according to the first criterion, at least one of the channel quality of the candidate cells, the number of beams, the frequency point priorities, or the slice information of the candidate cells may be considered.

In some embodiments, the target cell for cell selection or reselection may satisfy at least one of the following conditions:

having channel quality higher than a second cell selection or reselection threshold, having highest channel quality, having a largest number of beams, corresponding to a frequency point having a highest priority, supporting slicing, supporting slice information required by the terminal device, or supporting slice information matching the slice information required by the terminal device.

For example, when performing cell selection or reselection according to the first criterion, the cell selection or reselection may be performed according to the first cell selection or reselection threshold corresponding to the slice first, and if there is no cell having channel quality higher than or equal to the first cell selection or reselection threshold, the cell selection or reselection can be performed according to the second cell selection or reselection threshold.

As an example, the terminal device may select a cell having the highest channel quality among the candidate cells having channel quality higher than the second cell selection or reselection threshold as the target cell.

As an example, the terminal device may select a candidate cell having channel quality higher than the second cell selection or reselection threshold and supporting the slice required by the terminal device as the target cell.

In another example, when the channel quality of the cell does not satisfy the first cell selection or reselection threshold, the terminal device can make a selection based on the slice information. For example, from the candidate cells having channel quality that does not satisfy the first cell selection or reselection threshold, a cell that supports slicing, or supports the slice required by the terminal device, or supporting a slice that matches the slice required by the terminal device, can be selected as the target cell, so as to satisfy the slicing requirement of the terminal device.

In some embodiments of the present disclosure, the channel quality of the cell may be a measurement result of the cell, such as Reference Signal Receiving Power (RSRP), Reference Signal Receiving Quality (RSRQ), Signal to Interference plus Noise Ratio (SINR), Channel Quantity Indicator (CQI), Signal to Noise Ratio (SNR), etc.

In other embodiments of the present disclosure, the channel quality of the cell may be channel quality information adjusted according to the measurement result of the cell. For example, the measurement result of the cell plus a specific adjustment amount may be determined as the channel quality information of the cell. Optionally, the specific adjustment amount may be determined according to slice information of the cell.

For example, if the cell supports the slice information required by the terminal device, the corresponding adjustment amount may be the first adjustment amount, or if the cell does not support the slice information required by the terminal device, the corresponding adjustment amount may be a second adjustment amount. The first adjustment amount may be greater than the second adjustment amount.

For example, if channel quality of a first cell among the candidate cells is X1, and a corresponding adjustment amount is delt1, then target channel quality of the first cell is X1+delta1. If channel quality of the first cell is X2, and a corresponding adjustment is delta2, then target channel quality of a second cell is X2+delta2. Here, the first cell supports the slice information required by the terminal device, the second cell does not support the slice information required by the terminal device. The channel quality X1 of the first cell is lower than the channel quality X2 of the second cell, but delta1 is greater than delta2. If X1+delta1 is greater than X2+delta2, the first cell can be selected as the target cell, or otherwise the second cell can be selected as the target cell.

In the embodiment of the present disclosure, the channel quality information of the cell is fine-tuned according to the slice information of the cell, and further, when cell selection or reselection is performed according to the channel quality information, it is equivalent to considering both the slicing requirement of the terminal device and the channel quality of the cell, which facilitates satisfying the slicing requirement and coverage of the terminal device.

Optionally, in some embodiments, the method 200 may further include:

determining, by the terminal device when at least one of the following conditions is satisfied, that a cell satisfying a fourth condition is a suitable cell and/or performing a normal service in the suitable cell:

a cell selection or reselection result obtained by performing the cell selection or reselection according to the first criterion satisfying the third condition;

the terminal device performing the cell selection or cell reselection using the second criterion; or the terminal device falling back from the first criterion to the second criterion to perform the cell selection or cell reselection.

It should be understood that the cell satisfying the fourth condition may include any cell that does not satisfy at least one of the above Conditions 3.1, 3.2 and 3.3. For example, a cell having channel quality lower than the first cell selection or reselection threshold, a cell that does not satisfy the slicing condition, or a cell that does not support the first criterion, etc.

In other words, the cell satisfying the fourth condition may be a cell that does not satisfy at least one condition in the first criterion when selected based on the first criterion.

Optionally, the cell satisfying the fourth condition may include, but not limited to, at least one of:

a cell not supporting slicing;

a cell not supporting slice information required by the terminal device;

a cell supporting slice information that does not match the slice information required by the terminal device;

a cell satisfying the slicing condition, for example, a cell supporting slicing, or a cell supporting the slice required by the terminal device, or a cell supporting a slice that matches the slice of the terminal device; or a cell not supporting the first criterion.

Optionally, the cell satisfying the fourth condition may include a cell having high channel quality but not satisfying the slicing condition, or a cell having low channel quality and satisfying the slicing condition, or a cell having high channel quality and satisfying the slicing condition but not supporting the first criterion, etc.

Optionally, satisfying the slicing condition may include at least one of: supporting slicing, supporting the slice information required by the terminal device, or supporting slice information that matches the slice information required by the terminal device.

Optionally, in some embodiments, if the terminal device uses the first criterion to perform cell selection or reselection, but the cell selection or reselection result satisfies the above Condition 3.2 (that is, the candidate cells determined according to the first criterion do not satisfy the slicing condition), in this case the terminal device can determine a cell that does not support the intended slice of the terminal device or a cell where the supported slice of the network device does not match the intended slice of the terminal device as a suitable cell, and perform the normal service in the suitable cell.

Optionally, in some embodiments, if the terminal device uses the first criterion to perform cell selection or reselection, and when the cell selection or reselection result satisfies the above Condition 3.2 (that is, the candidate cells determined according to the first criterion do not satisfy the slicing condition), chooses to fall back to the second criterion to perform cell selection or reselection, in this case the terminal device may determine a cell that does not support the intended slice of the terminal device or a cell where the supported slice of the network device does not match the intended slice of the terminal device as a suitable cell, and perform the normal service in the suitable cell.

Optionally, in some embodiments, if the terminal device uses the second criterion to perform cell selection or reselection, in this case the terminal device may determine a cell that does not support the intended slice of the terminal device or a cell where the supported slice of the network device does not match the intended slice of the terminal device as a suitable cell, and perform the normal service in the suitable cell.

In this case, the normal service may include a service that is not related to the slice required by the terminal device, such as an emergency service.

Optionally, the terminal device can establish a PDU session corresponding to the slice required by the terminal device in the suitable cell, without activating the PDU session on the user plane, or the terminal device may not establish a PDU session corresponding to the slice required by the terminal device in the suitable cell.

Optionally, in some embodiments, if the terminal device uses the first criterion to perform cell selection or reselection, and the candidate cells determined according to the first criterion satisfy the slicing condition, for example, the cells support slicing, or the cells support the slice required by the terminal device, or the slices supported by the cells match the slice of the terminal device cell, in this case the terminal device may determine a cell that supports the intended slice of the terminal device or a cell where the supported slice of the network device matches the intended slice of the terminal device as a suitable cell, and perform the normal service in the suitable cell.

In this case, the normal service may include a service related to the slice required by the terminal device and a service not related to the slice required by the terminal device, such as an emergency service.

Optionally, the terminal device may establish a PDU session corresponding to the slice required by the terminal device in the suitable cell, and activate the PDU Session on the user plane.

Optionally, in some other embodiments, the method may further include:

determining, by the terminal device when at least one of the following conditions is satisfied, that a cell satisfying a fourth condition is an acceptable cell and/or performing a limited service in the acceptable cell:

a cell selection or reselection result obtained by performing the cell selection or reselection according to the first criterion not satisfying the third condition;

the terminal device performing the cell selection or cell reselection using the first criterion; or the terminal device falling back from the first criterion to the second criterion to perform the cell selection or cell reselection.

Optionally, the cell selection or reselection result obtained by performing the cell selection or reselection according to the first criterion not satisfying the third condition may include at least one of:

channel quality of a cell being high, for example, the channel quality of the cell being higher than the first cell selection or reselection threshold;

a cell satisfying the slicing condition, for example, the cell supporting slicing, or the cell supporting the slice required by the terminal device, or the slice supported by the cell matching the slice of the terminal device cell;

a cell not satisfying the slicing condition, for example, the cell not supporting slicing, or the cell not supporting the slice required by the terminal device, or the slice supported by the cell not matching the slice of the terminal device cell; or a cell not supporting the first criterion.

Optionally, in some embodiments, if the terminal device performs cell selection or reselection according to the first criterion, or when the result of cell selection or reselection according to the first criterion does not satisfy Condition 3.2 (that is, the candidate cells determined according to the first criterion satisfy the slicing condition), the terminal device may determine a cell that does not support the intended slice of the terminal device or a cell where the supported slice of the network device does not match the intended slice of the terminal device as an acceptable cell, and further perform a limited service in the acceptable cell.

Optionally, in some embodiments, if the terminal device performs cell selection or reselection according to the first criterion, or if the terminal device falls back to the second criterion to perform cell selection or reselection when the cell selection or reselection result according to the first criterion satisfies Condition 3.2 (that is, the candidate cells determined according to the first criterion do not satisfy the slicing condition), in this case the terminal device may determine a cell that does not support the intended slice of the terminal device or a cell where the supported slice of the network device does not match the intended slice of the terminal device as an acceptable cell, and further perform a limited service in the acceptable cell.

Optionally, the limited service may include a service that is not related to the slice required by the terminal device, such as an emergency service.

Optionally, the terminal device can establish a PDU session corresponding to the slice required by the terminal device in the acceptable cell, without activating the PDU session on the user plane, or the terminal device may not establish a PDU session corresponding to the slice required by the terminal device in the acceptable cell.

Optionally, in some embodiments, if the terminal device uses the first criterion to perform cell selection or reselection, and the candidate cells determined according to the first criterion satisfy the slicing condition, for example, the cells support slicing, or the cells support the slice required by the terminal device, or the slices supported by the cells match the slice of the terminal device cell, but the channel quality of the candidate cells is lower than the first cell selection or reselection threshold, or the channel quality of the candidate cells is lower than the first cell selection or reselection threshold for a time length that is greater than the first time length, in this case the terminal device may determine a cell that supports the intended slice of the terminal device or a cell where the supported slice of the network device matches the intended slice of the terminal device as an acceptable cell, and perform a limited service in the acceptable cell.

In this case, the limited service may include a service related to the slice required by the terminal device and a service not related to the slice required by the terminal device, such as an emergency service.

Optionally, the terminal device may establish a PDU session corresponding to the slice required by the terminal device in the acceptable cell, and activate the PDU Session on the user plane.

To summarize, the terminal device can perform cell selection or reselection based on the slice information required by the terminal device and the slice information supported by the network device. For example, when the slice information supported by the network device matches the slice information required by the terminal device, the slice-based cell selection or reselection criterion is given priority in cell selection or reselection, which facilitates satisfying the slicing requirement of the terminal device. When the slice information supported by the network device does not match the slice information required by the terminal device, the channel quality based cell selection or reselection criterion is given priority in cell selection or reselection, which facilitates preventing the terminal device from losing coverage.

Alternatively, the cell selection or reselection can be performed based on the first criterion first, and if no suitable cell can be selected, the cell selection or reselection may fall back to the second criterion, which facilitates preventing the terminal device from losing coverage, or the cell selection or reselection may continue based on the first criterion to select an acceptable cell from unsuitable cells, which facilitates considering both the slicing requirement and the coverage of the terminal device.

The wireless communication method according to the embodiment of the present disclosure has been described above in detail from the perspective of terminal device with reference to FIG. 2 to FIG. 4. The wireless communication method according to another embodiment of the present disclosure will be described in detail below from the perspective of network device with reference to FIG. 5. It should be understood that the description for the network device corresponds to the description for the terminal device, and for similar description, reference can be made to the above content, and details thereof will be omitted here for brevity.

FIG. 5 is a schematic flowchart illustrating a wireless communication method 300 according to another embodiment of the present disclosure. The method 300 may be performed by a network device in the communication system shown in FIG. 1. As shown in FIG. 5, the method 300 includes the following content.

At S310, a network device transmits indication information to a terminal device, the indication information indicating a scheme for the terminal device to perform cell selection or cell reselection.

In some embodiments of the present disclosure, the indication information may include first instruction information instructing the terminal device to determine a target criterion for performing the cell selection or cell reselection according to slice information of the terminal device and/or slice information of the network device and perform the cell selection or cell reselection according to the target criterion.

In some embodiments of the present disclosure, the indication information may include second instruction information instructing the terminal device to perform the cell selection or cell reselection according to a first criterion, the first criterion indicating to perform the cell selection or cell reselection based on slice information of the terminal device and/or slice information of the network device.

In some embodiments of the present disclosure, the indication information may include third instruction information instructing the terminal device to, when a cell selection or reselection result obtained by the terminal device performing the cell selection or cell reselection according to a first criterion satisfies a third condition, fall back to the second criterion to perform cell selection or cell reselection, or determine a target cell according to the result of performing the cell selection or cell reselection based on the first criterion.

In some embodiments of the present disclosure, the indication information may be transmitted via at least one of system information or dedicated signaling.

It should be understood that the first instruction information, the second instruction information and the third instruction information in the method 300 may correspond to the first instruction information, the second instruction information and the third instruction information in the method 200, respectively, and for the specific implementation, reference can be made to the method 200 and details thereof will be omitted here for brevity.

The method embodiments of the present disclosure have been described in detail above with reference to FIGS. 2-5, and the apparatus embodiments of the present disclosure will be described in detail below with reference to FIGS. 6-10. It can be appreciated that the apparatus embodiments and the method embodiments correspond to each other, and for similar descriptions, reference can be made to the method embodiments.

FIG. 6 shows a schematic block diagram of a terminal device 400 according to an embodiment of the present disclosure. As shown in FIG. 6, the terminal device 400 includes:

a processing unit 410 configured to perform cell selection or cell reselection according to slice information of the terminal device and/or slice information of a network device.

In some embodiments of the present disclosure, the slice information of the terminal device may include at least one of:

whether the terminal device supports slicing;

whether the terminal device has obtained slice information required by the terminal device;

whether the terminal device has obtained slice information supported by the network device; or the slice information required by the terminal device.

In some embodiments of the present disclosure, the slice information required by the terminal device may include at least one of:

a slice identifier corresponding to a slice required by the terminal device;

a slice group identifier corresponding to the slice required by the terminal device; or a parameter corresponding to the slice required by the terminal device.

In some embodiments of the present disclosure, the slice information of the network device may include at least one of:

whether the network device supports slicing; or slice information supported by the network device.

In some embodiments of the present disclosure, the slice information supported by the network device may include at least one of:

a slice identifier corresponding to a slice supported by the network device;

a slice group identifier corresponding to the slice supported by the network device;

a parameter corresponding to the slice supported by the network device;

a frequency point priority corresponding to the slice supported by the network device; or a cell selection parameter or a cell reselection parameter corresponding to the slice supported by the network device.

In some embodiments of the present disclosure, the processing unit 410 may be further configured to:

determine a target criterion for performing the cell selection or cell reselection according to the slice information of the terminal device and/or the slice information of the network device; and perform the cell selection or cell reselection according to the target criterion.

In some embodiments of the present disclosure, the processing unit 410 may be further configured to:

determine, when a first condition is satisfied, that the target criterion for performing the cell selection or cell reselection is a first criterion, the first criterion indicating to perform the cell selection or cell reselection based on the slice information of the terminal device and/or the slice information of the network device.

In some embodiments of the present disclosure, the first condition may include at least one of:

the terminal device supporting slicing;

the terminal device having obtained slice information required by the terminal device; or the slice information required by the terminal device matching slice information supported by the network device.

In some embodiments of the present disclosure, the processing unit 410 may be further configured to:

determine that a cell satisfying at least one of the following conditions is a suitable cell and/or performing a normal service in the suitable cell:

supporting slice information required by the terminal device; or the slice information required by the terminal device matching slice information supported by the network device.

In some embodiments of the present disclosure, the processing unit 410 may be further configured to:

determine, when at least one of the following conditions is satisfied, that a cell satisfying a fourth condition is a suitable cell and/or performing a normal service in the suitable cell:

a cell selection or reselection result obtained by performing the cell selection or reselection according to the first criterion satisfying the third condition;

the terminal device performing the cell selection or cell reselection using the second criterion; or the terminal device falling back from the first criterion to the second criterion to perform the cell selection or cell reselection.

In some embodiments of the present disclosure, the processing unit 410 may be further configured to:

determine, when at least one of the following conditions is satisfied, that a cell satisfying a fourth condition is an acceptable cell and/or performing a limited service in the acceptable cell:

a cell selection or reselection result obtained by performing the cell selection or reselection according to the first criterion not satisfying the third condition;

the terminal device performing the cell selection or cell reselection using the first criterion; or the terminal device falling back from the first criterion to the second criterion to perform the cell selection or cell reselection.

In some embodiments of the present disclosure, the cell satisfying the fourth condition may include at least one of:

a cell not supporting slicing;

a cell not supporting slice information required by the terminal device;

a cell supporting slice information that does not match the slice information required by the terminal device; or a cell not supporting the first criterion.

In some embodiments of the present disclosure, the terminal device 400 may further include:

a communication unit configured to receive first instruction information transmitted by the network device, the first instruction information instructing the terminal device to determine a target criterion for performing the cell selection or cell reselection according to the slice information of the terminal device and/or the slice information of the network device and perform the cell selection or cell reselection according to the target criterion.

In some embodiments of the present disclosure, the processing unit 410 may be further configured to:

perform the cell selection or cell reselection according to a first criterion, the first criterion indicating to perform the cell selection or cell reselection based on the slice information of the terminal device and/or the slice information of the network device.

In some embodiments of the present disclosure, the processing unit 410 may be further configured to:

perform, when a result of the cell selection or reselection based on the first criterion satisfies a third condition, cell selection or cell reselection according to a second criterion, the second criterion indicating not to perform the cell selection or cell reselection based on the slice information of the terminal device and/or the slice information of the network device; or determine, when the result of the cell selection or reselection based on the first criterion satisfies the third condition, a target cell for cell selection or reselection from candidate cells determined according to the first criterion.

In some embodiments of the present disclosure, the result of the cell selection or reselection satisfying the third condition may include at least one of:

channel quality of a cell being lower than or not higher than a first cell selection or reselection threshold corresponding to a slice of the network device;

the channel quality of the cell being lower than or not higher than the first cell selection or reselection threshold corresponding to the slice of the network device for a time length greater than or equal to a first time length;

the candidate cells determined according to the first criterion not supporting slicing;

no slice supported by the candidate cells determined according to the first criterion matching a slice required by the terminal device;

the candidate cells determined according to the first criterion not supporting slicing;

the candidate cells determined according to the first criterion not supporting a required slice; or the candidate cells determined according to the first criterion not supporting or not being indicated as supporting the first criterion.

In some embodiments of the present disclosure, the target cell for cell selection or reselection may satisfy at least one of the following conditions:

having channel quality higher than a second cell selection or reselection threshold, having highest channel quality, having a largest number of beams, corresponding to a frequency point having a highest priority, supporting slicing, supporting slice information required by the terminal device, or supporting slice information matching the slice information required by the terminal device.

In some embodiments of the present disclosure, the processing unit 410 may be further configured to:

determine that a cell satisfying at least one of the following conditions is a suitable cell and/or perform a normal service in the suitable cell:

the network device not supporting slicing;

the network device not supporting slice information required by the terminal device; or the slice information required by the terminal device not matching slice information supported by the network device.

In some embodiments of the present disclosure, the processing unit 410 may be further configured to:

determine that a cell satisfying at least one of the following conditions is an acceptable cell and/or perform a limited service in the acceptable cell:

the network device not supporting slicing;

the network device not supporting slice information required by the terminal device; or the slice information required by the terminal device not matching slice information supported by the network device.

In some embodiments of the present disclosure, the processing unit 410 may be further configured to:

determine that a cell satisfying at least one of the following conditions is an acceptable cell and/or perform a limited service in the acceptable cell:

the network device not supporting slicing;

the network device not supporting slice information required by the terminal device;

the slice information required by the terminal device not matching slice information supported by the network device;

a result of the cell selection or cell reselection not satisfying a third condition;

the terminal device performing the cell selection or cell reselection using the first criterion; or the terminal device falling back to the second criterion to perform cell selection or cell reselection.

In some embodiments of the present disclosure, the processing unit 410 may be further configured to:

determine that a cell satisfying at least one of the following conditions is a suitable cell and/or perform a normal service in the suitable cell:

a result of the cell selection or cell reselection not satisfying a third condition; or the terminal device using or falling back to the second criterion to perform cell selection or cell reselection.

In some embodiments of the present disclosure, the terminal device 400 may further include:

a communication unit configured to receive second instruction information transmitted by the network device, the second instruction information instructing the terminal device to perform the cell selection or cell reselection according to the first criterion.

In some embodiments of the present disclosure, the terminal device 400 may further include:

a communication unit configured to receive third instruction information transmitted by the network device, the third instruction information instructing the terminal device to, when a cell selection or reselection result obtained by the terminal device performing the cell selection or cell reselection according to the first criterion satisfies the third condition, fall back to the second criterion to perform cell selection or cell reselection, or determine a target cell according to the result of performing the cell selection or cell reselection based on the first criterion.

Optionally, in some embodiments, the above communication unit may be a communication interface or a transceiver, or an input/output interface of a communication chip or a system-on-chip. The above processing unit may be one or more processors.

It can be appreciated that the terminal device 400 according to the embodiment of the present disclosure may correspond to the terminal device in the method embodiment of the present disclosure, and the above and other operations and/or functions of the respective units in the terminal device 400 are provided for the purpose of implementing the process flow corresponding to the terminal device in the method 200 shown in FIGS. 2-4, and details thereof will be not omitted here for brevity.

FIG. 7 shows a schematic block diagram of a network device according to an embodiment of the present disclosure. As shown in FIG. 7, the network device 500 includes:

a communication unit 510 configured to transmit indication information to a terminal device, the indication information indicating a scheme for the terminal device to perform cell selection or cell reselection.

In some embodiments of the present disclosure, the indication information may include first instruction information instructing the terminal device to determine a target criterion for performing the cell selection or cell reselection according to slice information of the terminal device and/or slice information of the network device and perform the cell selection or cell reselection according to the target criterion.

In some embodiments of the present disclosure, the indication information may include second instruction information instructing the terminal device to perform the cell selection or cell reselection according to a first criterion, the first criterion indicating to perform the cell selection or cell reselection based on slice information of the terminal device and/or slice information of the network device.

In some embodiments of the present disclosure, the indication information may include third instruction information instructing the terminal device to, when a cell selection or reselection result obtained by the terminal device performing the cell selection or cell reselection according to a first criterion satisfies a third condition, fall back to the second criterion to perform cell selection or cell reselection, or determine a target cell according to the result of performing the cell selection or cell reselection based on the first criterion.

In some embodiments of the present disclosure, the indication information may be transmitted via at least one of system information or dedicated signaling.

Optionally, in some embodiments, the above communication unit may be a communication interface or a transceiver, or an input/output interface of a communication chip or a system-on-chip. It can be appreciated that the network device 500 according to the embodiment of the present disclosure may correspond to the network device in the method embodiment of the present disclosure, and the above and other operations and/or functions of the respective units in the network device 500 are provided for the purpose of implementing the process flow corresponding to the network device in the method 300 shown in FIG. 5, and details thereof will be not omitted here for brevity.

FIG. 8 is a schematic diagram showing a structure of a communication device 600 according to an embodiment of the present disclosure. The communication device 600 shown in FIG. 8 includes a processor 610, and the processor 610 can invoke and execute a computer program from a memory to implement the method in the embodiment of the present disclosure.

Optionally, as shown in FIG. 8, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, as shown in FIG. 8, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the network device according to the embodiment of the present disclosure, and the communication device 600 may implement the corresponding processes implemented by the network device in any of the methods according to the embodiments of the present disclosure. For the sake of brevity, details thereof will be omitted here.

Optionally, the communication device 600 may specifically be the mobile terminal/terminal device according to the embodiment of the present disclosure, and the communication device 600 may implement the corresponding processes implemented by the terminal device in any of the methods according to the embodiments of the present disclosure. For the sake of brevity, details thereof will be omitted here.

Figure 9:
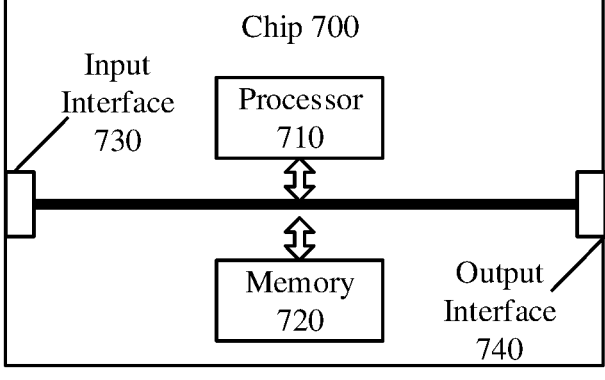
FIG. 9 is a schematic block diagram of a chip according to an embodiment of the present disclosure.

FIG. 9 is a schematic diagram showing a structure of a chip according to an embodiment of the present disclosure. The chip 700 shown in FIG. 9 includes a processor 710, and the processor 710 can invoke and execute a computer program from a memory to implement the method in the embodiment of the present disclosure.

Optionally, as shown in FIG. 9, the chip 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, the chip 700 may further include an input interface 730. The processor 810 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding processes implemented by the mobile terminal/terminal device in the various methods of the embodiments of the present disclosure. For the sake of brevity, details thereof will be omitted here.

It can be appreciated that the chip in the embodiment of the present disclosure may also be referred to as a system-level chip, a system-chip, a chip system, or a system-on-chip.

US 12,581,398 B2

31

32

Figure 10:
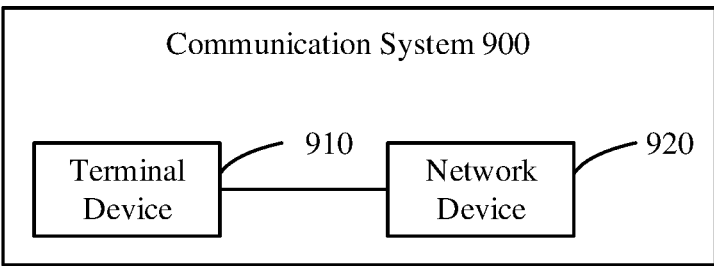
FIG. 10 is a schematic block diagram of a communication system according to an embodiment of the present disclosure.

FIG. 10 is a schematic block diagram showing a communication system 900 according to an embodiment of the present disclosure. As shown in FIG. 10, the communication system 900 includes a terminal device 910 and a network device 920.

Here, the terminal device 910 can be configured to implement the corresponding functions implemented by the terminal device in the above method, and the network device 920 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
determining, by a terminal device, a target criterion for performing cell selection or cell reselection according to slice information of the terminal device and/or slice information of a network device, wherein the determining the target criterion comprises:
determining, by the terminal device in response to a first condition being satisfied, that the target criterion is a first criterion, the first criterion indicating to perform the cell selection or the cell reselection based on the slice information of the terminal device and/or the slice information of the network device, wherein the first condition comprises: the terminal device having obtained slice information required by the terminal device; and
determining, by the terminal device in response to a second condition being satisfied, that the target criterion is a second criterion, the second criterion indicating not to perform the cell selection or the cell reselection based on the slice information of the terminal device and/or the slice information of the network device, wherein the second condition comprises: the terminal device having not obtained the slice information required by the terminal device; and
performing, by the terminal device, the cell selection or the cell reselection according to the target criterion.

2. The wireless communication method according to claim 1, wherein the slice information of the terminal device comprises:
whether the terminal device has obtained the slice information required by the terminal device.

3. The wireless communication method according to claim 2, wherein the slice information required by the terminal device comprises:
a slice group identifier corresponding to a slice required by the terminal device.

4. The wireless communication method according to claim 1, wherein the slice information of the network device comprises:
slice information supported by the network device.

5. The wireless communication method according to claim 4, wherein the slice information supported by the network device comprises at least one of:
a slice group identifier corresponding to a slice supported by the network device; or
a frequency point priority corresponding to the slice supported by the network device.

6. The wireless communication method according to claim 1, further comprising:
determining, by the terminal device, that a cell satisfying the following condition is a suitable cell and/or performing a normal service in the suitable cell:
supporting slice information required by the terminal device.

7. The wireless communication method according to claim 1, further comprising:
performing, by the terminal device when a result of the cell selection or reselection based on the first criterion satisfies a third condition, the cell selection or the cell reselection according to the second criterion.

8. The wireless communication method according to claim 7, wherein the result of the cell selection or the cell reselection satisfying the third condition comprises:
the candidate cells determined according to the first criterion not supporting a required slice.

9. A terminal device, comprising a processor and a memory, wherein the memory has a computer program stored thereon, and the processor is configured to invoke and execute the computer program stored in the memory to:
determine a target criterion for performing cell selection or cell reselection according to slice information of the terminal device and/or slice information of a network device, wherein the determining a target criterion comprises:
determine when a first condition is satisfied, that the target criterion is a first criterion, the first criterion indicating to perform the cell selection or the cell reselection based on the slice information of the terminal device and/or the slice information of the network device, wherein the first condition comprises: the terminal device having obtained slice information required by the terminal device; and determine when a second condition is satisfied, that the target criterion is a second criterion, the second criterion indicating not to perform the cell selection or the cell reselection based on the slice information of the terminal device and/or the slice information of the network device, wherein the second condition comprises: the terminal device having not obtained the slice information required by the terminal device; and perform the cell selection or the cell reselection according to the target criterion.

10. A network device, comprising a processor and a memory, wherein the memory has a computer program stored thereon, and the processor is configured to invoke and execute the computer program stored in the memory to:

transmit indication information to a terminal device, the indication information indicating a scheme for the terminal device to perform cell selection or cell reselection, wherein the indication information comprises first instruction information instructing the terminal device to determine a target criterion for performing the cell selection or the cell reselection according to slice information of the terminal device and/or slice information of the network device and perform the cell selection or the cell reselection according to the target criterion;

the indication information comprises second instruction information instructing the terminal device to perform the cell selection or the cell reselection according to a first criterion, the first criterion indicating to perform the cell selection or the cell reselection based on the slice information of the terminal device and/or the slice information of the network device; and the indication information comprises third instruction information instructing the terminal device to perform the cell selection or the cell reselection according to a second criterion, the second criterion instructing not to perform the cell selection or the cell reselection based on the slice information of the terminal device and/or the slice information of the network device.

11. The network device according to claim 10, wherein the third instruction information instructing the terminal device to, when a cell selection or reselection result obtained by the terminal device performing the cell selection or the cell reselection according to the first criterion satisfies a third condition, fall back to the second criterion to perform the cell selection or the cell reselection.

12. The network device according to claim 10, wherein the indication information is transmitted via at least one of system information or dedicated signaling.

* * * * *